(12) United States Patent
Arkko et al.

(10) Patent No.: US 9,538,348 B2
(45) Date of Patent: Jan. 3, 2017

(54) METHOD AND MESSAGE SERVER FOR ROUTING A SPEECH MESSAGE

(75) Inventors: Jari Arkko, Kauniainen (FI); Jouni Mäenpää, Nummela (FI); Tomas Mecklin, Kyrkslätt (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 61 days.

(21) Appl. No.: 14/404,689

(22) PCT Filed: Jun. 4, 2012

(86) PCT No.: PCT/SE2012/050593
§ 371 (c)(1),
(2), (4) Date: Dec. 1, 2014

(87) PCT Pub. No.: WO2013/184048
PCT Pub. Date: Dec. 12, 2013

(65) Prior Publication Data
US 2015/0148084 A1    May 28, 2015

(51) Int. Cl.
| | | |
|---|---|---|
| H04M 1/64 | (2006.01) | |
| H04W 4/18 | (2009.01) | |
| G10L 15/26 | (2006.01) | |
| H04M 3/533 | (2006.01) | |
| G10L 15/30 | (2013.01) | |
| H04W 4/12 | (2009.01) | |
| H04L 12/58 | (2006.01) | |
| H04M 3/42 | (2006.01) | |

(52) U.S. Cl.
CPC ............... *H04W 4/18* (2013.01); *G10L 15/26* (2013.01); *G10L 15/30* (2013.01); *H04L 51/066* (2013.01); *H04M 1/645* (2013.01); *H04M 3/533* (2013.01); *H04W 4/12* (2013.01); *H04M 3/42382* (2013.01); *H04M 2201/40* (2013.01); *H04M 2203/357* (2013.01); *H04M 2203/4536* (2013.01); *H04M 2242/22* (2013.01)

(58) Field of Classification Search
CPC .. H04M 1/271; H04M 2201/40; H04M 3/533; H04M 1/645; H04W 4/18; G10L 15/26; G10L 15/30
USPC ................. 379/88.04, 88.11, 88.13; 370/356
See application file for complete search history.

(56) References Cited

U.S. PATENT DOCUMENTS

| 7,400,711 B1 * | 7/2008 | Ford ................. H04M 3/20 |
| | | 379/114.13 |
| 2002/0067808 A1 | 6/2002 | Agraharam et al. |

(Continued)

FOREIGN PATENT DOCUMENTS

| EP | 1879000 A1 | 1/2008 |
| WO | 03092248 A2 | 11/2003 |
| WO | 2008021505 A2 | 2/2008 |

*Primary Examiner* — Van D Huynh
(74) *Attorney, Agent, or Firm* — Patent Portfolio Builders, PLLC

(57) ABSTRACT

A method and message server (204) for routing a speech message, received (2:1) from a user equipment (200) of a sending user, to at least one recipient (208, 210) in a communication network. After obtaining (2:2) a text version created by speech recognition (206) of the received speech message, the at least one recipient is identified (2:3) by the message server based on the obtained text version, and the speech message is then routed (2:5) to the identified at least one recipient.

13 Claims, 4 Drawing Sheets

(56) References Cited

U.S. PATENT DOCUMENTS

2004/0252679 A1* 12/2004 Williams ............ H04L 12/5692
                                                    370/356
2008/0045256 A1    2/2008 Wang et al.
2011/0211680 A1    9/2011 Wilson
2011/0268260 A1* 11/2011 Madhavapeddi ...... G06Q 10/00
                                                    379/88.13

* cited by examiner

US 9,538,348 B2

METHOD AND MESSAGE SERVER FOR ROUTING A SPEECH MESSAGE

TECHNICAL FIELD

The present disclosure relates generally to a method and a message server for routing a speech message to one or more recipients.

BACKGROUND

In the field of telecommunication, speech recognition is sometimes employed in various communication services, meaning that a user is able to speak voice commands into a User Equipment, UE, for controlling some functionality therein or in a communication network, rather than entering written commands and pressing buttons on a keyboard or the like. In some applications, a speech recognition function in the UE or in the network is able to translate the entered voice command into a text such as a recognizable message or just a single word. A spoken voice command in the UE may also be sent in digitally encoded form to a speech recognition entity where the actual speech recognition is executed by analyzing and translating the speech into corresponding text. Recently, speech recognition has been applied for smart phones e.g. the speech-based service called "Siri" developed for Apple iPhones.

FIG. 1 illustrates an example of how conventional speech recognition can be used in a communication network for controlling some service function or apparatus which could be any voice-controllable device or function such as, e.g., a teleconference bridge, a banking service, an electronic game, functions in a telephone or computer, control of various home appliances, and so forth. Thus, when a spoken command is entered in a UE 100, shown as an action 1:1, the UE 100 provides a digitized version of the speech as signals to a speech recognition entity 102, shown as another action 1:2. The speech recognition entity 102 then translates the received speech signals into a text version of the speech, in an action 1:3. As said above, the speech recognition entity 102 may be implemented in the network or in the UE 100 itself.

Possibly, the entity 102 may also utilize a function referred to as "Artificial Intelligence", AI, 104 to make a more or less elaborated interpretation of the spoken command, as shown by a schematic action 1:4. In that case, the AI function 104 basically deduces the meaning of a spoken question or command once it has been converted to text by the speech recognition 102. As a result, the speech recognition 102 may issue a control message or command corresponding to the entered speech, as shown in an action 1:5, which somehow controls or otherwise interacts with a service function or apparatus 106. The service function or apparatus 106 may then process the control message and operate accordingly such as providing a suitable response back to the UE 100, as shown by a final action 1:6.

In general, the speech recognition services known today include two parts, the actual speech recognition and the interpretation thereof e.g. by means of an AI function or the like. In different typical implementations, both of these parts may reside in the UE or partly or completely in nodes of the network. In the above-mentioned service Siri for iPhones, a simplified speech analysis and AI analysis is made by the phone, which in parallel may send the speech in text form to an AI function in the network for obtaining a more advanced analysis and creation of a suitable response or other action.

In some cases, a user of a UE may want to convey a message to another user without actually calling the other user and have a conversation. For example, the first user may not want to disturb or take time to talk with the other user, but may just want to convey the message in a simple and convenient manner. One option is of course to send an SMS or other written message which may however be time-consuming and difficult to do depending on the current situation. It would be much easier to just send a spoken message to a voice-mail box or convey it to the other user's UE in real time, e.g. by means of the known "Push-to-talk over Cellular", PoC, service. However, this would still require entering the telephone number or other address of the other user which may not be easily available to the first user. It is thus a problem that conveying a written or spoken message to a recipient according to conventional technique requires some additional efforts by the first user. This could be an even greater problem if the first user wants to convey the spoken message to several recipients which basically requires that the message is sent separately to each recipient by entering the telephone number or address of each individual recipient.

Another area associated with similar problems of conveying speech messages to particular recipients is conference calls where voice commands can be used for controlling a conference call. In conference calls, the speakers may use a push-to-talk function by pressing a button on the UE when they want to speak. However, in order to direct a spoken message in a conference call to a particular recipient, it is necessary that the sending user enters a number or address of the recipient. Otherwise, it is common in conference calls that spoken messages are always routed to all registered participants of the conference, which sometimes may not be desirable or suitable.

SUMMARY

It is an object of embodiments described herein to address at least some of the problems and issues outlined above. It is also an object to convey a spoken message to one or more recipients without requiring that a telephone number or other address of the recipient(s) must be used. It is possible to achieve these objects and others by using a method and a message server as defined in the attached independent claims.

According to one aspect, a method is performed in a message server for routing a speech message to at least one recipient in a communication network. In this method, the message server receives the speech message which has been sent from a user equipment in audio form when a sending user has spoken the speech message into the user equipment. The message server then obtains a text version created by speech recognition of the received speech message, and identifies the at least one recipient based on the obtained text version. The speech message is finally routed to the identified at least one recipient.

According to another aspect, a message server is configured to route a speech message to at least one recipient in a communication network. The message server comprises a communication unit adapted to receive the speech message sent from a user equipment in audio form when a sending user has spoken the speech message into the user equipment. The message server also comprises an obtaining unit adapted to obtain a text version created by speech recognition of the received speech message, a logic unit adapted to identify the at least one recipient based on the obtained text version, and a routing unit adapted to route the speech message to the identified at least one recipient.

When employing the above method and message server, one or more of the following example benefits may be achieved. Firstly, it is not required that the sending user enters a telephone number or other address of an intended recipient for sending the speech message, since routing information is indicated in the actual speech. This is an advantage particularly when sending the message to several recipients and/or when the number or address is not known or easily available. Secondly, it is also possible to get across different spoken messages to different recipients by formulating the messages appropriately to indicate the intended recipients. Thirdly, it is also easy to direct a spoken message to a voice-mail box or convey it to the other user's UE in real time, e.g. by means of the PoC service, instead of making a written message and without having to converse with or disturb the other user.

The above method and message server may be configured and implemented according to different optional embodiments. In one possible embodiment, the intended recipient(s) may be identified further based on a contact list of the sending user, which could increase the accuracy of identifying the correct recipient(s) and routing the message thereto.

The received speech message may also be processed based on contextual information regarding the sending user, e.g. by adding information deduced by analysis of any of the obtained text version and the contextual information. Thereby, the speech message can be improved and/or clarified by modification such that the message can be made more comprehensive and clear before it is delivered. For example, the text version may in that case be modified and translated into speech in audio form before routing the speech message to the at least one recipient. Further, the added information may indicate any of: the identity of the sending user, a location, and a context or characteristics of the sending user.

In further possible embodiments, the contact list or contextual information may be obtained from any of: meta data received with the speech message, user information that has been pre-configured in the message server, and user information maintained by another node or service in the communication network. The received speech message may further be addressed to a service application used by the sending user.

In other possible embodiments, a group of multiple recipients may be identified, and in that case the message server routes the speech message to each recipient in the group. The group of multiple recipients may be identified when the received speech message contains a word or phrase that implies said group. The group of multiple recipients may further be identified depending on the current context of the sending user.

To ensure accuracy of the routing decision of identifying the recipient(s), the sending user could also be prompted to verify the identified at least one recipient before routing the speech message to the recipient(s). Further, the speech message could be sent as a text message to the identified at least one recipient, either as an alternative or addition to sending it in audio form.

Further possible features and benefits of this solution will become apparent from the detailed description below.

BRIEF DESCRIPTION OF DRAWINGS

The solution will now be described in more detail by means of some possible embodiments and with reference to the accompanying drawings, in which.

DETAILED DESCRIPTION

Figure 1:
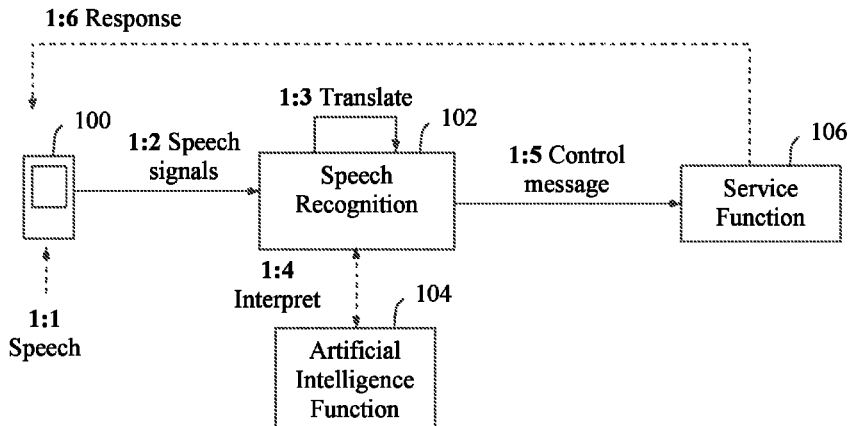
FIG. 1 is a communication scenario illustrating an example of using speech recognition, according to the prior art.

Briefly described, a solution is provided in a message server to enable a speech message, e.g. generated when a sending user presses a "Push-to-talk" button on his/her UE, to reach its recipient without requiring that a telephone number or address of the recipient must be entered by the sending user. In this solution, the message server thus receives the spoken message and is able to identify the recipient by analyzing and interpreting the spoken message, provided that it contains some word or phrase that indicates the recipient in some way. For example, the recipient's name may be mentioned in the speech message from which the message server can identify the correct intended recipient and his/her number or address, and then route the message thereto.

The solution will now be explained further with reference to the example shown in the block diagram of FIG. 2. A UE 200 is operated by a user, who will be called the "sending user" in the following, implying that the user wants to get across a spoken message to a certain intended recipient, in the figure represented by another UE 208, e.g. in real time in a push-to-talk manner, or as a recorded piece of audio. The UE 200 may be any type of communication device that allows spoken messages to be entered and sent to recipients. During this scenario, the UE 200 is connected to a communication network 202 allowing communication of speech messages from the UE 200. The term "communication network" is used here in a broad sense and may in practice be comprised of various access and transport networks without limitation. For example, network 202 may be configured for wireless access such as a Public Land Mobile Network PLMN, or for wired access such as a Public Switched Telephone Network PSTN. The network 202 may further employ either circuit-switched or packet-switched communication, or both, and so forth. The solution is thus not limited to any particular types of UEs or communication networks.

The solution also involves a message server 204 which is used for routing spoken messages to intended recipients, as follows. The message server 204 may reside basically anywhere in the communication network discussed here, e.g. in a node for handling PoC services, or in a conference service node, and so forth. In a first shown action 2:1, a speech message that the sending user has spoken into the UE 200, is conveyed in a digitized audio form from the UE to the message server 204.

It is assumed the user has a particular recipient in mind to whom the entered speech message is intended. Therefore, the sending user may be careful to phrase his message in a way that the intended recipient can be deduced therefrom. It should further be noted that the sending user has not dialled any telephone number or other address of the intended recipient, which is thus not required thanks to this solution.

Having received the speech message in audio form, the message server 204 obtains a text version of the message by employing a speech recognition function 206, shown by an action 2:2. The speech recognition function 206 may reside in a separate node or inside the message server 204 itself, and may use any currently available speech recognition technique for creating a text version of the received speech message. The technique for translating audio into text is well-known as such and is not necessary to describe here to understand the solution. Throughout this description, the term "in audio form" should be understood such that the message is represented as digitized audio, which is also a well known technique.

The message server 204 then identifies the intended recipient, in a following action 2:3, by analyzing the obtained text version in search for a word or phrase that indicates the recipient. For example, the speech message may be: "Peter Berg, I want you in my office at 5 pm today", and the message server 204 may read the phrase "Peter Berg" therein and recognize that person as the intended recipient of the message. In this action, the recipient may be identified further based on a contact list of the sending user by matching words and phrases in the speech message with entries in the contact list to identify the recipient more accurately.

In fact, it may in some cases be more or less necessary to use some kind of contact list associated with the sending user in order to identify the correct recipient, e.g. when indicated in the message by a very common name such as just "Peter" or by a more descriptive term such as "Mother". To ensure that the correct person has been identified, the sending user may also be prompted by the message server 204 to verify a suggested recipient, which will be described further below.

The message server 200 may obtain the contact list in different ways, depending on the implementation. In one possible option, a contact list locally configured in the UE 200 may be included as meta data in the speech message when sent from the UE 200 in action 2:1. In another possible option, the contact list may be available as user information that has been pre-configured in the message server 200. In yet another possible option, the contact list may be available as user information maintained by another node or service in the communication network 202, which the message server 200 can fetch if needed as indicated by an optional action 2:3a. This other node or service may be, to mention a few non-limiting examples, a presence server, a Home Location Register HLR, a Resource List Server RLS, or a Converged Address Book CAB server. In some cases the above contact list may have been configured by the user with persons selected specifically for this speech recognition feature, while in other cases a contact list created for other purposes could be utilized for this solution as well.

In action 2:3, it is further possible to identify more than one recipient such as a group of recipients, if the speech message contains a word or phrase that indicates such a group. For example, the words "all", "everybody", "all boys" or "any of you" might indicate a group of individuals in some way associated with the sending user. The message server 204 may further interpret the meaning of words or phrases in the message based on contextual information regarding the sending user. This contextual information may be obtained e.g. in the same manner as the contact list described above, i.e. from meta data in the received message, or from user information available in the message server 200 or in another node in the network 202, the latter alternative being indicated by action 2:3a. The received speech message may also be addressed to a certain service application used by the sending user which can be seen as a contextual information of the user as well that might influence the interpretation.

When the speech message contains the word "everyone" or similar, the message server needs to understand which recipients the sending user has in mind, depending on his context, in order to route the message to those recipients. For example, if the speech message was sent in the context of an Instant Messaging, IM, application, the message server may conclude that "everyone" refers to all of the user's IM buddies who are online, which information may be obtained from an RLS. In another example when the speech message is not sent in the context of any application but directly from the UE's main menu or similar, the message server may assume that "everyone" refers to all persons in the user's address book, e.g., a CAB. The interpretation of "everyone" could also depend on other contextual factors such as the sending user's current location.

As shown by a further action 2:4, the message server 204 may also process the speech message in some way, e.g. by eliminating any redundancies such as coughs, stammers, repetitions, slip of the tongue, etc., or by adding clarifying information that can be deduced from the message or from the above-mentioned contextual information regarding the sending user. The message server 204 may thus draw further conclusions from the message, e.g. by determining the location of the sending user's office in the above example and adding the address thereof to the message.

A final action 2:5 illustrates that the speech message, processed or not, is routed to the identified recipient 208. If more than one recipient has been identified in action 2:3, such as a group of recipients 210, the same speech message can be routed to each recipient in the group, as shown by dashed arrows in the figure. It is an advantage for the sending user that it is not necessary to have knowledge of and access to any telephone number or other address of the recipient 208, nor to enter such a number or address on the UE 200 since the message will be routed to the intended recipient anyway by means of the described mechanism. The required routing information is thus embedded "in-band" in the spoken message itself which can be extracted by the message server in the described manner, and no explicit routing information needs to be added.

Figure 2:
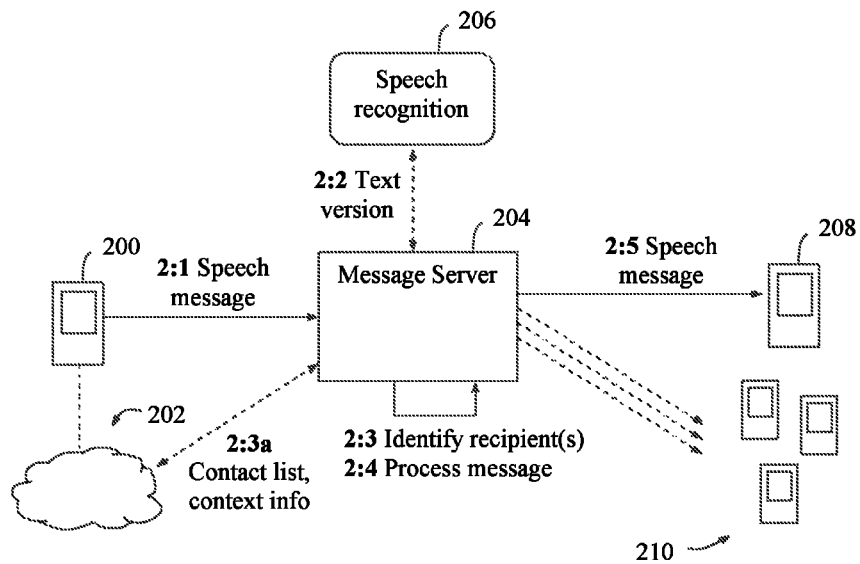
FIG. 2 is a block diagram illustrating how a speech message can be routed to a particular recipient, according to some possible embodiments.
Figure 3:
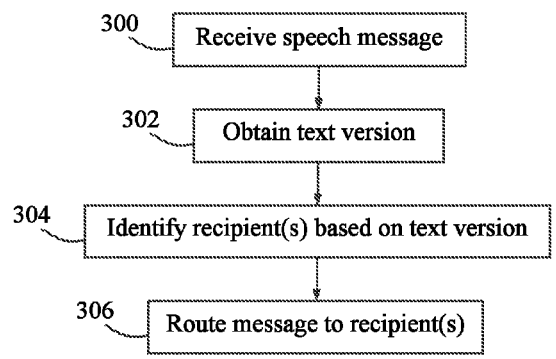
FIG. 3 is a flow chart illustrating a procedure in a message server when the solution is used, according to further possible embodiments.

The flow chart of FIG. 3 comprises actions performed by a message server configured according to this solution, for routing a speech message to at least one recipient in a communication network. The message server may act basically as the message server 200 in FIG. 2. In a first action 300, the message server receives the speech message sent from a user equipment in audio form when a sending user has spoken the speech message into the user equipment, basically corresponding to action 2:1 in FIG. 2. In a next action 302, the message server obtains a text version created by speech recognition of the received speech message, basically corresponding to action 2:2 in FIG. 2.

In a further action 304, the message server identifies the at least one recipient based on the obtained text version, basically corresponding to action 2:3 in FIG. 2. In a final shown action 306, the message server routes the speech message to the identified at least one recipient, basically corresponding to action 2:5 in FIG. 2.

Figure 4:
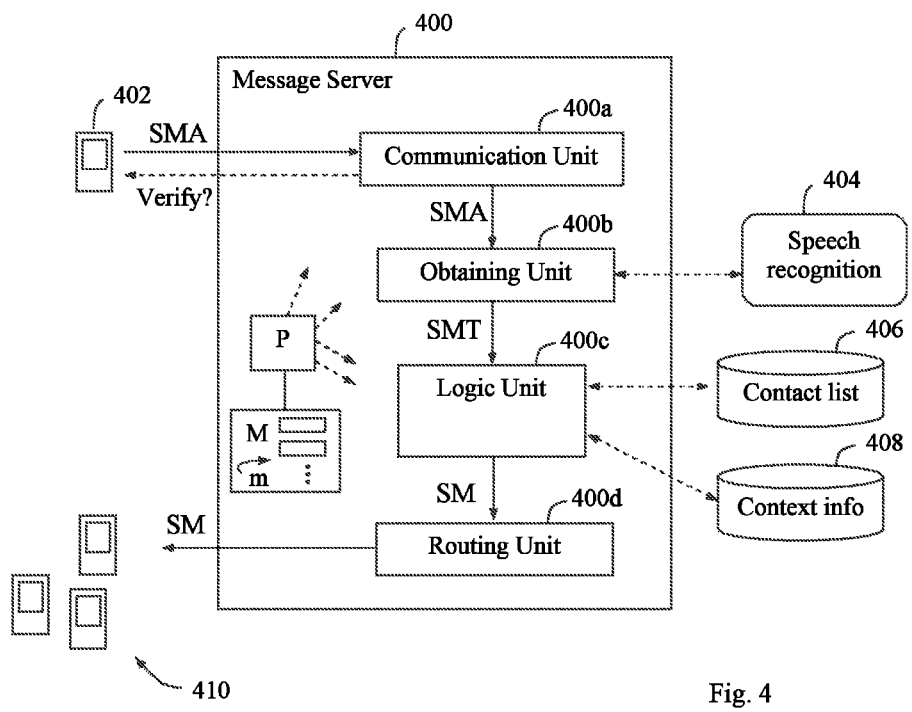
FIG. 4 is a block diagram illustrating a message server in more detail when being used, according to further possible embodiments.

A detailed but non-limiting example of how a message server can be configured to accomplish the above-described solution, is illustrated by the block diagram in FIG. 4. The message server 400 is configured to route a speech message to at least one recipient, e.g. according to the procedures described herein for any of FIGS. 2, 3, 5 and 6, respectively.

The message server 400 comprises a communication unit 400a adapted to receive the speech message sent from a user equipment 402 in audio form, denoted "SMA", when a sending user has spoken the speech message into the user equipment. The message server 400 also comprises an obtaining unit 400b adapted to obtain a text version created by speech recognition 404 of the received speech message, the text version being denoted "SMT". The functionality for speech recognition 404 may be implemented in the message server 400 or in an outside node.

The message server 400 further comprises a logic unit 400c adapted to identify the at least one recipient based on the obtained text version SMT. The logic unit 400c may be adapted to identify the at least one recipient further based on a contact list 406 of the sending user which may be obtained as described above. The logic unit 400c may also be adapted to process the message and modify it, e.g. by adding information. The processed modified text version may then be translated into speech in audio form. The logic unit 400c may be further adapted to process the speech message based on contextual information 408 regarding the sending user. After the recipient identification and processing made by the logic unit 400c, the speech message is denoted "SM" in the figure, which thus could be in text form or audio form or both. The message server 400 also comprises a routing unit 400d adapted to route the speech message to the identified at least one recipient 410.

The above message server 400 and its functional units 400a-d may be configured or adapted to operate according to various optional embodiments. In a possible embodiment, the logic unit 400c may be further adapted to identify the at least one recipient further based on a contact list 406 of the sending user, which contact list may be obtained from meta data received with the speech message, or from user information pre-configured in the message server or maintained by another node or service in the communication network.

In another possible embodiment, the logic unit 400c may be further adapted to process the received speech message based on contextual information 408 regarding the sending user, which contextual information may likewise be obtained from meta data in the speech message, or from user information available in the message server or from another node or service. The logic unit 400c may also be adapted to process the received speech message by adding information deduced by analysis of any of the obtained text version and the contextual information. For example, the logic unit 400c may be adapted to modify and translate the text version into speech in audio form before the speech message is routed and delivered to the at least one recipient. Alternatively or additionally, logic unit 400c may send the text version of the speech message to the recipient(s). For example, the added information may indicate the identity of the sending user, a location, and/or a context or characteristics of the sending user.

The logic unit 400c may be further adapted to identify a group of multiple recipients 410, and in that case the routing unit 400d is adapted to route the speech message to each recipient in the group. The logic unit 400c may be further adapted to identify the group of multiple recipients when the received speech message contains a word or phrase that implies this group. The logic unit 400c may be further adapted to identify the group of multiple recipients depending on the current context of the sending user. It was mentioned and explained above that contextual information of the user might influence the interpretation of the speech message.

The communication unit 400a may be further adapted to prompt the sending user to verify the identified at least one recipient before the speech message is routed to the identified at least one recipient. This feature can be used to ensure that the message is not sent to the "wrong" recipient, e.g. due to misunderstanding of the message.

It should be noted that FIG. 4 illustrates various functional units in the message server 400 and the skilled person is able to implement these functional units in practice using suitable software and hardware. Thus, the solution is generally not limited to the shown structures of the message server 400, and the functional units 400a-d may be configured to operate according to any of the features described in this disclosure, where appropriate.

The functional units 400a-d described above can be implemented in the message server 400 by means of program modules of a respective computer program comprising code means which, when run by a processor "P" causes the message server 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the message server 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the message server 400.

As mentioned above, the message server of this solution may need to obtain information about the sending user's context, i.e. the above-described contextual information regarding the sending user, in order to identify a recipient and to make a routing decision thereto. An example is when the speech message is "Bob, come here". In this, case the message server needs to figure out who Bob is in order to identify the recipient, and also where the sending user is located to interpret and clarify the meaning of "here". This may be achieved as follows, according to some practical examples.

In a first option, the sending user may have provided necessary information to the message server, e.g., address book, the application being used, current location, and so forth, when registering with the message server and configuring the service. In a second option, contextual information may be provided as metadata with the speech message from the sending user's UE. In a third option, the message server may have interfaces to other services and nodes that have access to such contextual information about the sending user.

To obtain the identity and contact information of Bob, the message server may need access to the sending user's address book, such as a CAB maintained at a CAB server. This information can be retrieved if the message server has an interface towards the CAB server.

In another example, if the speech message is sent from an IM application, the message server could fetch the sending user's buddy list from an RLS and determine the identity of "Bob" by checking the buddy list. The message server may know that the speech message was sent from an IM application when the user has indicated that an IM application is currently used and the speech message should be interpreted in the context of that application.

To determine the meaning of "here", the message server may have an interface towards a service that tracks the location of the user, such as an HLR of a mobile network or a presence server tracking the geographical location of the user. In the latter case, the message server may subscribe to the user's geographical location from the presence server.

As described earlier, a message server according to this solution could in some cases also modify the content of a speech message by adding relevant and/or clarifying information. This information may likewise be deduced from contextual information regarding the sending user. An example is the speech message "Alice, come here". A simple way to expand this speech message is to add information about the sending user, such as his name, to the end of the speech message, resulting in "Alice, come here. This message was sent by Bob".

A more elaborate example is to replace the word "here" with more explicit location information, such as "Alice, come to Torshamnsgatan 23". To be able to do this, semantic analysis is required to determine that "here" refers to the sending user's location. Further, the message server may also need to determine the sending user's context, e.g. Bob's current location as coordinates. This can be achieved as described above. Further, the user's coordinates may be translated into the street address by accessing a street map service. Finally, the output of the speech-to-text translation, i.e. the text version, may be modified such that the word "here" is replaced with the street address "Torshamnsgatan 23" and the expanded text version may then be translated to speech in audio form again before routing the modified message to the recipient(s). The text-to-speech translation can potentially be performed by speech synthesis using the characteristics of Bob's voice if known to the message server. This is possible if the message server can be configured with such characteristics.

Naturally, there may be some cases when the content of the speech message is so vague that it is not possible for the message server to interpret and expand the words or phrases in the speech message. An example is the speech message "Give me that thing over there", where the key words that might be expanded include "that thing" and "over there". Expanding such key words in a speech-only system may be difficult and quite unreliable. However, it might be possible to expand even such ambiguous key words if the user sends a video stream or a photo, taken by a camera in the UE, together with the speech message to the message server for analysis using object recognition. To conclude, the interpretation and expansion of a speech message may be done in many ways, based on contextual information regarding the sending user, and the solution is not limited to any particular aspects or characteristics of the contextual information.

Figure 5:
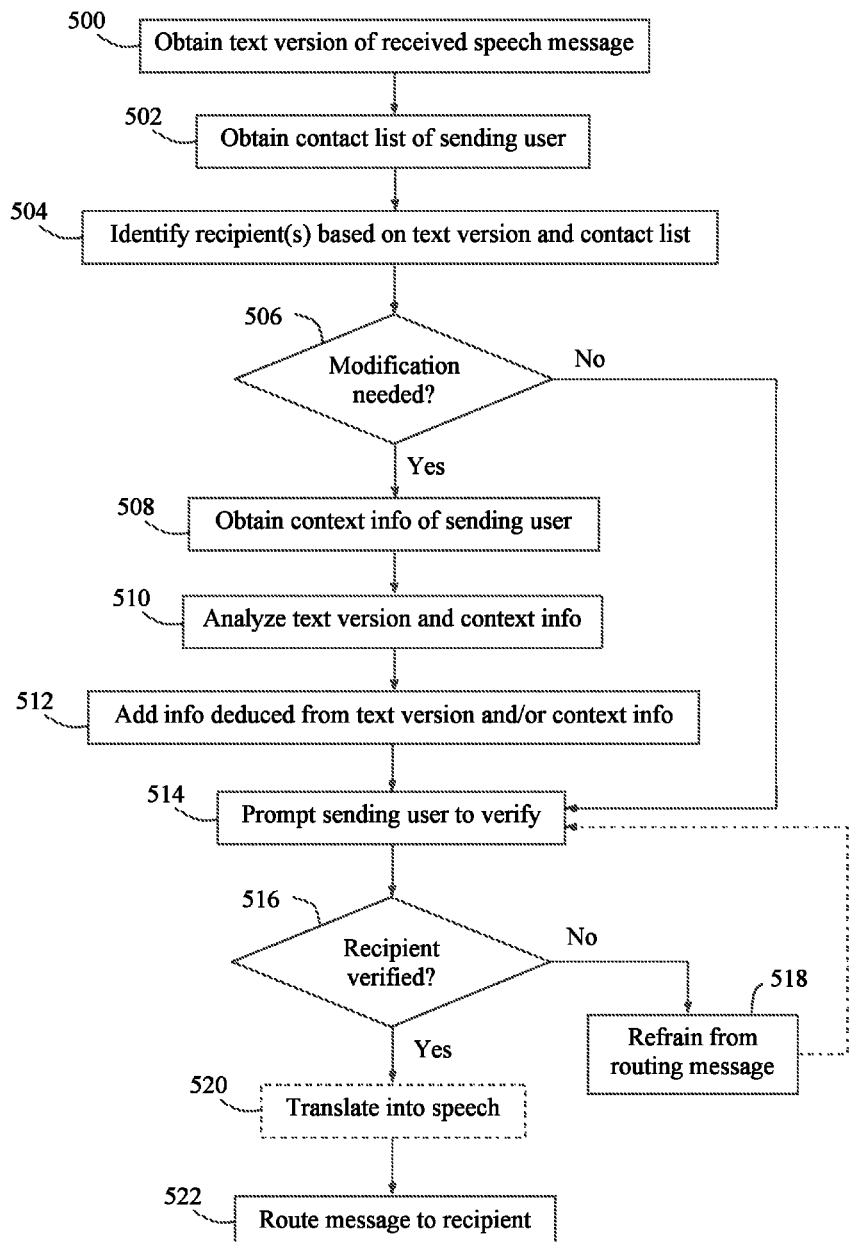
FIG. 5 is a flow chart illustrating a more detailed example of a procedure in a message server, according to further possible embodiments.

A more detailed example of a procedure that could be performed by a message server in accordance with further possible embodiments, will now be described with reference to the flow chart in FIG. 5. The message server in this example may be configured as shown in FIG. 4 and may act basically as the message server 204 in FIG. 2. After receiving a speech message sent from a UE of a sending user, the message server obtains a text version of the speech message, in a first shown action 500 and also obtains a contact list of the sending user, in another action 502. In a following action 504, the message server identifies at least one recipient based on the obtained text version and contact list. The three actions so far could be performed according to various alternatives already described for the previous examples, which will not be repeated here.

In a further action 506, the message server determines whether any modification of the speech message is needed or not. In this determination, a specific logic for analyzing the message may be used, which may be implemented in the logic unit 400c of FIG. 4. For example, a speech message may be more or less informative or explicit and some terms or phrases therein may be difficult to fathom and understand for a future recipient. If the message is deemed to contain such vague terms or phrases, the analyzing logic may add information that explains or clarifies those terms or phrases. For example, the word "here" implies a current location of the sending user which could be specified as a specific street address or the like, as described above.

If it is determined in action 506 that such modification of the message is needed or warranted, the message server obtains contextual information about the sending user, in an action 508. The message server then analyzes the text version and the obtained contextual information, in another action 510. As a result from this analysis, the message server modifies the message by adding information which has been deduced from the analyzed text version and contextual information, in an action 512. The message could at this point be routed to the identified recipient(s) according to one possible embodiment. However, this example further includes a verification procedure as follows.

In a further action 514, the message server prompts the sending user to verify the at least one recipient identified in action 504 above, e.g. by returning a question to the user's UE, saying: "Please verify that your speech message will be routed to Recipient X", or similar. This could also be an option that can be configured by the sending user by activating and deactivating the verification prompt. If the sending user does not verify the proposed recipient(s), e.g. by answering no or not at all, the message server refrains from routing the message to the proposed recipient(s), in an action 518. The message server may then return to action 514, as shown by a dashed arrow, and prompt the user again to verify another proposed recipient that has also been identified but deemed less likely than the first suggested recipient(s).

If the user verifies the proposed recipient(s), i.e. if a positive response to the prompt is received, the text version of the message may be translated into speech in audio form, in an optional action 520, and the message is finally routed in audio form to the proposed and verified recipient(s), in an action 522. The speech message could additionally or alternatively be routed to the recipient(s) in the text version and the solution is not limited in this respect. It should be noted that the process shown in FIG. 5 may be modified without departing from the solution. For example, the actions 514 and 516 of prompting the user and getting verification of the identified recipient(s) may be performed before or at the same time as the actions 506-512 of modifying the speech message.

Figure 6:
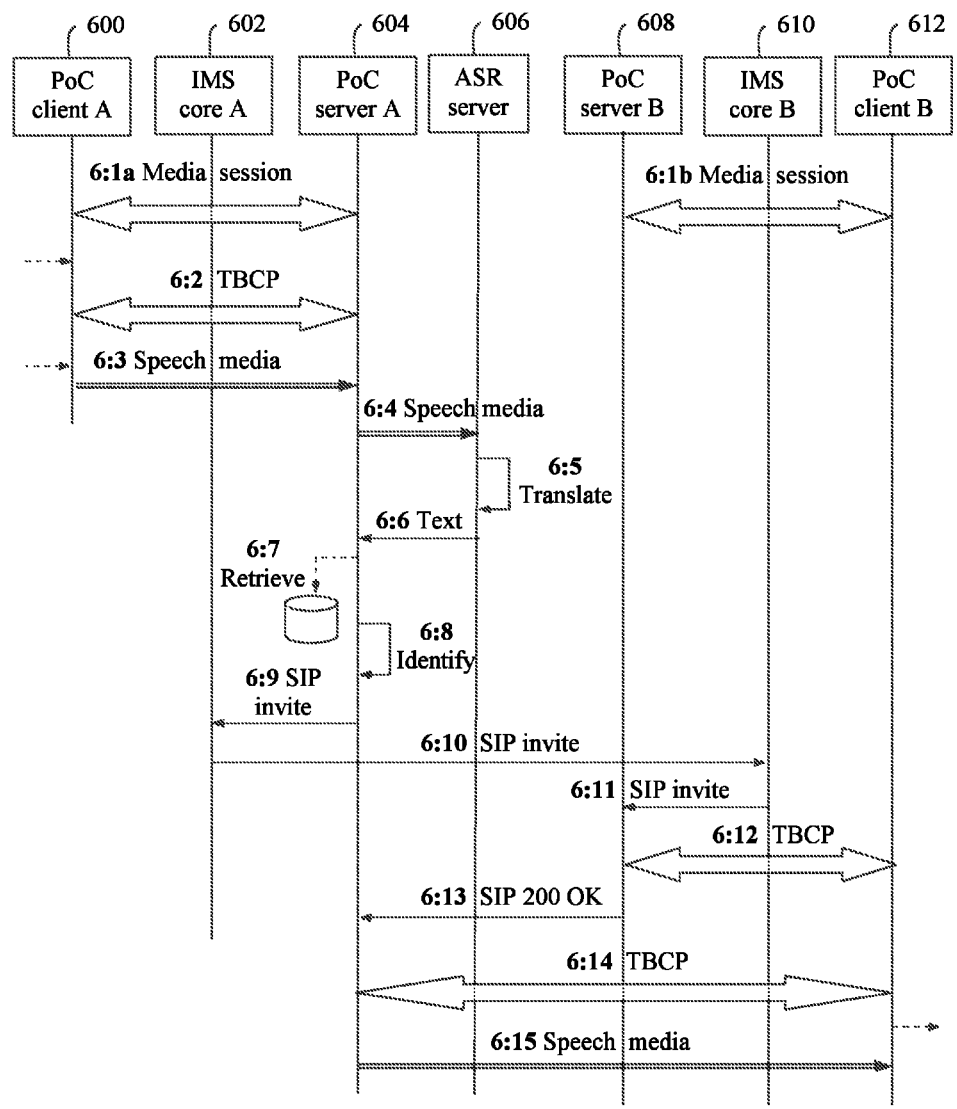
FIG. 6 is a signalling diagram illustrating an example of implementing the solution in practice, according to further possible embodiments.

Another detailed example of implementing the solution in practice in the context of a PoC service, will now be described with reference to the signalling diagram in FIG. 6. A sending user indicated "A" intends to send a speech message to a recipient user denoted "B". This example involves on the A side a PoC client 600 controlled by the sending user A, an IMS core 602 handling sessions for PoC client 600, a PoC server 604 providing a PoC service for PoC client 600, and a so-called "Automatic Speech Recognition", ASR, server 606 configured to perform translation of speech in audio form into text. In this example, the PoC server 604 of A basically acts as the above-described message server being designed to route spoken messages to appropriate recipients. On the B side, a PoC server 608 provides a PoC service and an IMS core 610 handles sessions for a PoC client 612 controlled by the recipient user B.

Initially, a PoC session is assumed to be established for PoC clients 600 and 612, represented in the figure as actions 6:1a and 6:1b, respectively, involving regular signalling between the clients 600 and 612 and their respective PoC servers 604 and 608. A first dashed arrow to 600 indicates that user A presses a push-to-talk button on his UE which triggers a signalling procedure according to the so-called "Talk Burst Control Protocol", TBCP, between PoC client 600 and PoC server 604 in an action 6:2, basically to prepare and reserve resources allowing user A to talk and get a speech message across to an intended recipient.

A second dashed arrow indicates that user A speaks the message into his UE which results in the sending of speech media in audio form from PoC client 600 to PoC server 604 shown as an action 6:3. The speech media is sent in audio form to PoC server 604 using the Real-Time Protocol, RTP. The PoC server 604 then obtains a text version of the received RTP speech media by forwarding the media to the ASR server 606, in another action 6:4, for analysis. The ASR server 606 translates the speech message into a text version of the message in action 6:5, which may include semantic analysis of the speech in the received RTP media, and returns the text version to the PoC server 604 in action 6:6. The PoC server 604 then retrieves a contact list of the user A, in a further action 6:7, e.g. from a local storage if such information is maintained locally at the PoC server 604, or from an external storage or service such as an RLS, HLR or other source.

The PoC server 604 then identifies the intended recipient based on the retrieved contact list of the user A, shown by a further action 6:8, e.g. by matching words or phrases in the speech message with entries in the contact list. Although not indicated in this example, this identification may be further based on contextual information about the user A, as described above for some preceding examples. It is also possible for the PoC server 604, or alternatively for the ASR server 606, to modify the message based on the identified recipient and/or on the contextual information of user A, e.g. by adding clarifying or explanatory information to the message, before routing it to the recipient, as likewise described above for some preceding examples.

Thereby, the PoC server 604 of user A has taken a routing decision and sends a SIP invite message to the PoC server 608 of user B, with the purpose of establishing a media session for delivery of the speech message to User B. The SIP invite message is routed over IMS core 602 of A in an action 6:9, over IMS core 610 of B in an action 6:10, and eventually arrives at PoC server 608 in an action 6:11.

The PoC server 608 of B performs the TBCP signalling procedure with PoC client 612 of B, in an action 6:12, basically to prepare and reserve resources allowing PoC client 612 of B to receive the speech message from PoC client 600 of A. The PoC server 608 of B then responds to the SIP invite by sending a conventional response message called SIP 200 OK to PoC server 604 of A, in an action 6:13, which message is routed, not shown, over IMS cores 610 and 602 of B and A, respectively.

In a further action 6:14, the PoC server 604 of A performs the TBCP signalling procedure with PoC client 612 of B, to notify user B that user A has been granted to speak. A third dashed arrow from 612 indicates that user B is notified that user A is calling and that speech therefrom is to be expected. Finally, an action 6:15 indicates that the speech media, i.e. the speech message, is routed and delivered to PoC client 312 of B.

Some examples of advantages that can be achieved by employing the solution according to any of the above described embodiments, include:

A) It is not required that the sending user enters a telephone number or other address of an intended recipient when sending a speech message, which is helpful for the sending user particularly when he wants to get the message across to several recipients at the same time, or when the number or address is not known or easily available. The routing information is thus included "in-band", i.e. embedded in the actual speech.

B) It is possible for the sending user when engaged in a conference call or the like with multiple other participants, to get across different spoken messages to different recipients in a flexible and easy manner, simply by formulating the messages appropriately to indicate therein the intended recipient(s).

C) It is a convenient way for the sending user to just send a spoken message to a voice-mail box or convey it to the other user's UE in real time, e.g. by means of the PoC service, instead of making a written message and without having to converse with or disturb the other user.

D) Intelligent "improvements" can be made of the speech message by modification based on the intended recipient(s) and on contextual information about the sending user. The message can thereby be made more comprehensive and clear before it is delivered.

While the solution has been described with reference to specific exemplary embodiments, the description is generally only intended to illustrate the inventive concept and should not be taken as limiting the scope of the solution. For example, the terms "user equipment", "message server", "speech message", "recipient" and "contextual information" have been used throughout this description, although any other corresponding nodes, functions, and/or parameters could also be used having the features and characteristics described here. The solution is defined by the appended claims.

The invention claimed is:

1. A method, performed in a message server, for routing a speech message to at least one recipient in a communication network, the method comprising:
   receiving the speech message sent from a user equipment in audio form when a sending user has spoken the speech message into the user equipment;
   obtaining a text version created by speech recognition of the received speech message;

obtaining contextual information comprising at least one contextual factor regarding the sending user;

identifying the at least one recipient based on the obtained text version; and routing the speech message to the identified at least one recipient;

wherein the received speech message is processed based on the contextual information regarding the sending user; wherein processing the received speech message comprises modifying the received speech message by adding information deduced by analysis of the obtained text version and the contextual information.

2. The method of claim 1, wherein the text version is modified and translated into speech in audio form before routing the speech message to the at least one recipient.

3. The method of claim 1, wherein the added information indicates any of: the identity of the sending user, a location, and a context or characteristics of the sending user.

4. The method of claim 1, wherein the contextual information is obtained from any of: meta data received with the speech message, user information that has been pre-configured in the message server, and user information maintained by another node or service in the communication network.

5. The method of claim 1, wherein multiple recipients are identified, depending on the current context of the sending user, and wherein the speech message is routed to each of the multiple recipients.

6. The method of claim 1, wherein the speech message is sent as a text message to the identified at least one recipient.

7. A message server configured to route a speech message to at least one recipient in a communication network, the message server comprising a processing circuit and a memory circuit containing computer program instructions for execution by the processing circuit, the computer program instructions comprising instructions for:

receiving the speech message sent from a user equipment in audio form when a sending user has spoken the speech message into the user equipment;

obtaining a text version created by speech recognition of the received speech message;

obtaining contextual information comprising at least one contextual factor regarding the sending user;

identifying the at least one recipient based on the obtained text version;

routing the speech message to the identified at least one recipient; and processing the received speech message based on the contextual information regarding the sending user; wherein the memory circuit further comprises programming instructions for processing the received speech message by modifying the received speech message by adding information deduced by analysis of the obtained text version and the contextual information.

8. The message server of claim 7, wherein the memory circuit further comprises programming instructions for modifying and translating the text version into speech in audio form before the speech message is routed to the at least one recipient.

9. The message server of claim 7, wherein the added information indicates any of: the identity of the sending user, a location, and a context or characteristics of the sending user.

10. The message server of claim 7, wherein the memory circuit comprises programming instructions for obtaining the contextual information from any of: meta data received with the speech message, user information that has been pre-configured in the message server, and user information maintained by another node or service in the communication network.

11. The message server of claim 7, wherein the memory circuit further comprises programming instructions for identifying multiple recipients, depending on the current context of the sending user, and for routing the speech message to each of the multiple recipients.

12. The message server of claim 7, wherein the memory circuit comprises programming instructions for sending the speech message as a text message to the identified at least one recipient.

13. A non-transitory computer-readable medium comprising, stored thereupon, a computer program comprising computer readable code units that, when run on a message server, cause the message server to:

receive the speech message sent from a user equipment in audio form when a sending user has spoken the speech message into the user equipment, obtain a text version created by speech recognition of the received speech message, obtain contextual information comprising at least one contextual factor regarding the sending user;

identify the at least one recipient based on the obtained text version, and route the speech message to the identified at least one recipient, wherein the received speech message is processed based on the contextual information regarding the sending user; wherein processing the received speech message comprises modifying the received speech message by adding information deduced by analysis of the obtained text version and the contextual information.

* * * * *